United States Patent [19]
Adamson

[11] Patent Number: 5,818,442
[45] Date of Patent: Oct. 6, 1998

[54] METHOD AND APPARATUS FOR MODELING BUSINESS CARD EXCHANGES IN AN INTERNATIONAL ELECTRONIC CONFERENCE

[75] Inventor: Peter Adamson, Portland, Oreg.

[73] Assignee: Intel Corporation, Santa Clara, Calif.

[21] Appl. No.: 640,004

[22] Filed: Apr. 30, 1996

[51] Int. Cl.[6] .................................................. G06F 3/14
[52] U.S. Cl. ................................................ 345/330; 704/8
[58] Field of Search .................................. 395/329, 330, 395/336, 339, 348, 350, 968, 798, 755, 758, 200.04, 751, 759, 200.34; 345/329, 330, 336, 339, 348, 350, 968; 704/5, 8, 1, 9; 707/536

[56] References Cited

U.S. PATENT DOCUMENTS

| | | | |
|---|---|---|---|
| 4,456,969 | 6/1984 | Herzik et al. ............................ | 707/533 |
| 5,025,395 | 6/1991 | Nose et al. .............................. | 345/335 |
| 5,226,117 | 7/1993 | Miklos et al. ........................... | 345/356 |
| 5,307,265 | 4/1994 | Winans .................................... | 704/8 |
| 5,493,105 | 2/1996 | Desai ...................................... | 235/375 |
| 5,500,929 | 3/1996 | Dickinson .............................. | 345/356 |
| 5,506,954 | 4/1996 | Arshi et al. ............................. | 345/501 |
| 5,544,358 | 8/1996 | Capps et al. ............................ | 707/523 |
| 5,548,507 | 8/1996 | Martino et al. ............................. | 704/1 |
| 5,600,827 | 2/1997 | Nakabayashi et al. ..................... | 707/2 |
| 5,634,129 | 5/1997 | Dickinson .............................. | 395/683 |
| 5,640,565 | 6/1997 | Dickinson .............................. | 395/683 |
| 5,706,517 | 1/1998 | Dickinson .............................. | 395/683 |

FOREIGN PATENT DOCUMENTS

WO 94/17479  8/1994  WIPO .

OTHER PUBLICATIONS

U.S. Patent Application for "M&A For Modelling Business Card Exchanges In A Point–To–Point Or A Multi–Point Personal Conference"; Skaroo, et al.; A/N: 08/444,020; Filed May 18, 1995; pp. 1–22.

U.S. Patent Application for "M&A For Exchanging Electronic Business Cards In A Point–To–Point Or A Multi–Point PC Conference"; Kukkal et al.; A/N: 08/538,628; Filed Sep. 29, 1995; pp. 1–21.

*Primary Examiner*—Matthew M. Kim
*Assistant Examiner*—Crescelle N. dela Torre
*Attorney, Agent, or Firm*—Blakely, Sokoloff, Taylor & Zafman

[57] ABSTRACT

A computer system is programmed with a general purpose electronic conference (GPEC) application having a conference manager including a plurality of functions for setting up and exchanging "business cards" electronically, thereby modeling the business card exchange behavior of conference participants of face-to-face conferences. In particular, the functions for setting up and exchanging "business card" electronically include the ability to set up a special international name displayable in most languages, and automatically substitute the name of a conference participant with the international name in the event a received electronic "business card" was originated from a conferencing system configured with an incompatible language. As a result, usability of an international electronic conference is improved.

30 Claims, 18 Drawing Sheets

|  SRT IDX  | STRING VALUE |
|---|---|
| ⋮ | ⋮ |
| X | "OFFICE" |
|  |  |
|  |  |

METHOD AND APPARATUS FOR MODELING BUSINESS CARD EXCHANGES IN AN INTERNATIONAL ELECTRONIC CONFERENCE

BACKGROUND OF THE INVENTION

1. Field of the Invention

The present invention relates to the field of electronic conferencing. More specifically, the present invention relates to modeling participant behavior of traditional face-to-face conferences in an international electronic conferences.

2. Background Information

As advances in telecommunication and computing technology continue to bring forth more powerful electronic conferencing systems, both users and system integrators desire closer modeling of participant behaviors of traditional face-to-face conferences in electronic conferences. One particular behavior of interest is the practice of conference participants exchanging business cards in face-to-face conferences. The business cards not only serve as vehicles of introduction, they also serve as information sources. It is not uncommon for conference participants to save the exchanged business cards and refer to them later on.

The conference participants may refer to the saved business cards for a variety of reasons. Sometimes, the conference participants may be referring to the saved business cards to determine the "connection addresses" of persons they met. Other times, the conference participants may be referring to the saved business cards simply to remind them of the persons they met, or to figure out the roles, the interests, etc. of the fellow participants in attending particular conferences or advocating particular points of views, through the fellow participants' affiliations, titles etc. Yet other times, the conference participants may be referring to the saved business cards as a resource for someone to whom they themselves can turn or refer colleagues, clients etc. to consult on certain subject matters.

In sum, notwithstanding the limited amount of information typically contained in a business card, its utility is amazingly broad. In fact, it is a common practice for professionals in a variety of disciplines to routinely enter the information in business cards into their address databases for subsequent retrieval for the purposes described earlier, and/ or for mailing of announcements, seasonal greeting cards etc.

A method and apparatus for modeling business card exchanges was disclosed in copending application, Ser. No. 08/444,020, filed on May 18, 1995, and an improved method and apparatus for exchanging the electronic business cards, in particular in the context of a multi-point electronic conference was disclose in copending application, Ser. No. 08/535,628, filed on Sep. 28, 1995.

However, neither case addresses certain unique situations that arise only in international electronic conferences. In such conferences, it is not uncommon for the conference participants to be operating with conferencing systems configured with different native languages, e.g. German, French, Chinese, Japanese. Thus, the electronic business cards being exchanged will be in different languages. This is not a problem for conferencing systems configured with compatible native languages, e.g. English and French. However, for conferencing systems configured with incompatible native languages, e.g. English and Chinese, the exchanged electronic business cards will most likely be displayed with unreadable special characters, resulting in serious usability compromises.

Thus, it is desirable to be able to model business card exchanges for conference participants of in an international electronic conference in a more user friendly manner. As will be disclosed in more detail below, the method and apparatus of the present invention achieves these and other desirable results.

SUMMARY OF THE INVENTION

A computer system is programmed with a general purpose electronic conference (GPEC) application having a conference manager including a plurality of functions for setting up and exchanging "business cards" electronically, thereby modeling the business card exchange behavior of conference participants of face-to-face conferences. In particular, the functions for setting up and exchanging "business card" electronically include the ability to set up a special international name displayable in most languages, and automatically substitute the name of a conference participant with the international name in the event a received electronic "business card" was originated from a conferencing system configured with an incompatible language. In one embodiment, the functions for setting up and exchanging "business cards" electronically further include the ability to automatically suppress or convert unreadable characters prior to displaying a received electronic "business card", if the received electronic "business card" was originated from a conferencing system configured with an incompatible or partially compatible language.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION OF THE INVENTION

In the following description, various aspects of the present invention will be described. However, it will be apparent to those skilled in the art that the present invention may be practiced with only some or all aspects of the present invention. For purposes of explanation, specific numbers, materials and configurations are set forth in order to provide a thorough understanding of the present invention. However, it will also be apparent to one skilled in the art that the present invention may be practiced without the specific details. In other instances, well known features are omitted or simplified in order not to obscure the present invention.

Parts of the description will be presented in terms of operations performed by a computer system, using terms such as data, flags, bits, values, characters, strings, numbers and the like, consistent with the manner commonly employed by those skilled in the art to convey the substance of their work to others skilled in the art. As well understood by those skilled in the art, these quantities take the form of electrical, magnetic, or optical signals capable of being stored, transferred, combined, and otherwise manipulated through mechanical and electrical components of the computer system; and the term computer system include general purpose as well as special purpose data processing machines, systems, and the like, that are standalone, adjunct or embedded.

Figure 1:
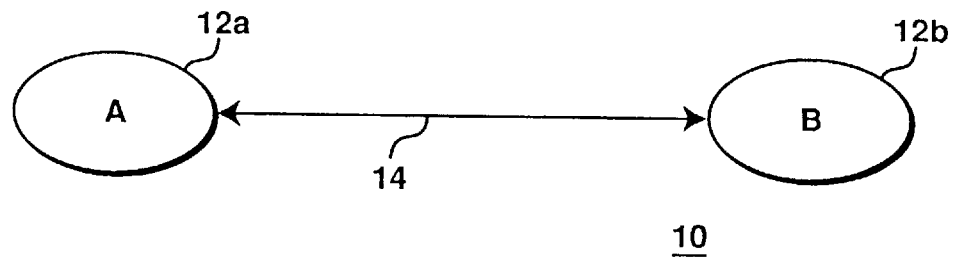
FIGS. 1–2 are block diagrams illustrating a typical point-to-point and a typical multi-point international electronic conference incorporating the teachings of the present invention.
Figure 2:
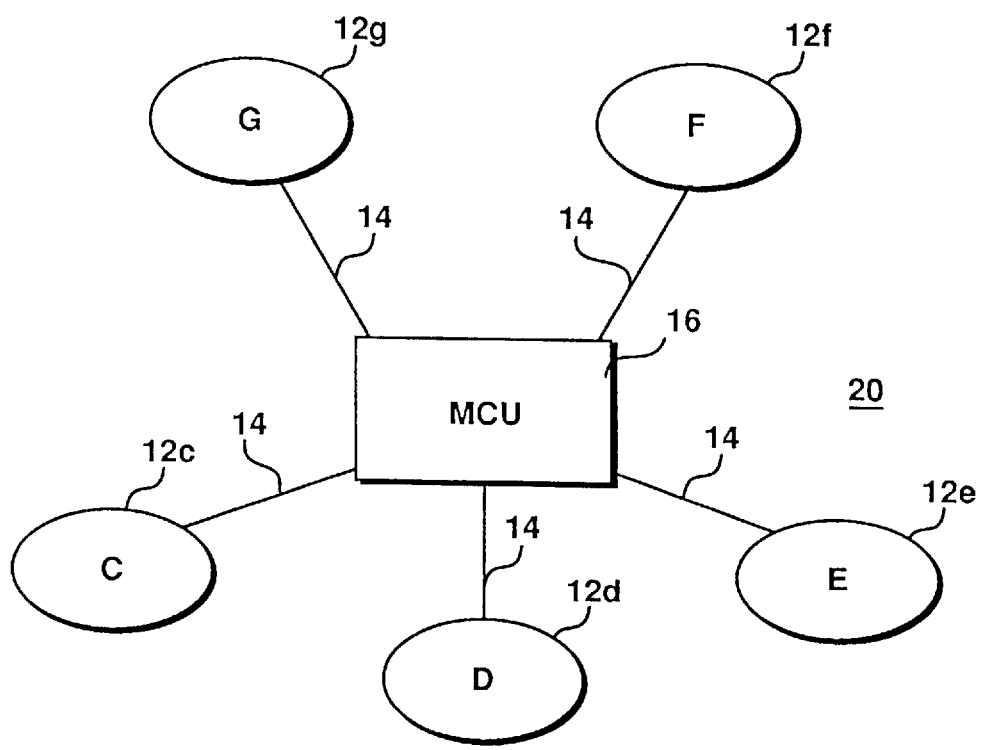

Various operations will be described as multiple discrete steps in turn in a manner that is most helpful in understanding the present invention, however, the order of description should not be construed as to imply that these operations are necessarily order dependent, in particular, the order of presentation. Referring now to FIGS. 1–2, two block diagrams illustrating two embodiments of networks of electronic conferencing systems incorporated with the teachings of the present invention are shown. FIG. 1 illustrates a point-to-point embodiment 10, whereas FIG. 2 illustrates a multi-point embodiment 20. Point-to-point embodiment 10 comprises conferencing systems A & B 12a and 12b connected to each over via POTS or ISDN 14, whereas multi-point embodiment 20 comprises conferencing systems C–G 12c–12g and multi-point control unit (MCU) 16 connected to each other also via POTS or ISDN 14. For the purpose of this application, conferencing systems A–G 12a–12g are internationally dispersed. Conferencing systems A 12a and B 12b are joined together in conference when one of the two conferencing systems 12a or 12b call the other. Conferencing systems C–G 12c–12g are joined together in conference via MCU 16 when conferencing systems 12c–12g individually call MCU 16.

While for ease of explanation, multi-point embodiment 20 is illustrated with all conferencing systems C–G 12c–12g joined in conference via one MCU 16, based on the description to follow, it will be appreciated that the present invention may be practiced with multi-point conferencing systems employing one or more MCU's 16. Furthermore, MCU 16 may be managing multiple multi-point conferences.

For the illustrated embodiments, conferencing systems A–G 12a–12g and MCU 16 are all equipped with i486 or Pentium® class processors manufactured by the assignee of the present invention. Of course, processors manufactured by other vendors may be employed. Each of conferencing systems A–G 12a–12g and MCU 16 is also equipped with communication interface(s) and storage medium. Conferencing systems A–G 12a–12g are further equipped with audio/video subsystems. Communication interfaces, storage medium, and audio/video subsystems may be implemented with any number of such elements well known in the art.

MCU 16 is equipped with multi-point control software having capabilities similar to MCUs employed in AT&T's WorldWorx$^{SM}$ service provided by AT&T of New Jersey. Conferencing systems A–G 12a–12g are all programmed with operating systems equipped with native language support, and compatible general purpose electronic conference (GPEC) applications incorporated with teachings of the present invention. The base conferencing functions of each of these GPEC applications are similar to those offered by the ProShare™ Personal Conferencing System manufactured by the assignee of the present invention. The extended conferencing functions of the present invention for setting up and exchanging business cards electronically in an international electronic conference will be described in more detail below. For a more detailed description of WorldWorx$^{SM}$ and ProShare™, refer to their respective product literature's.

Figure 3:
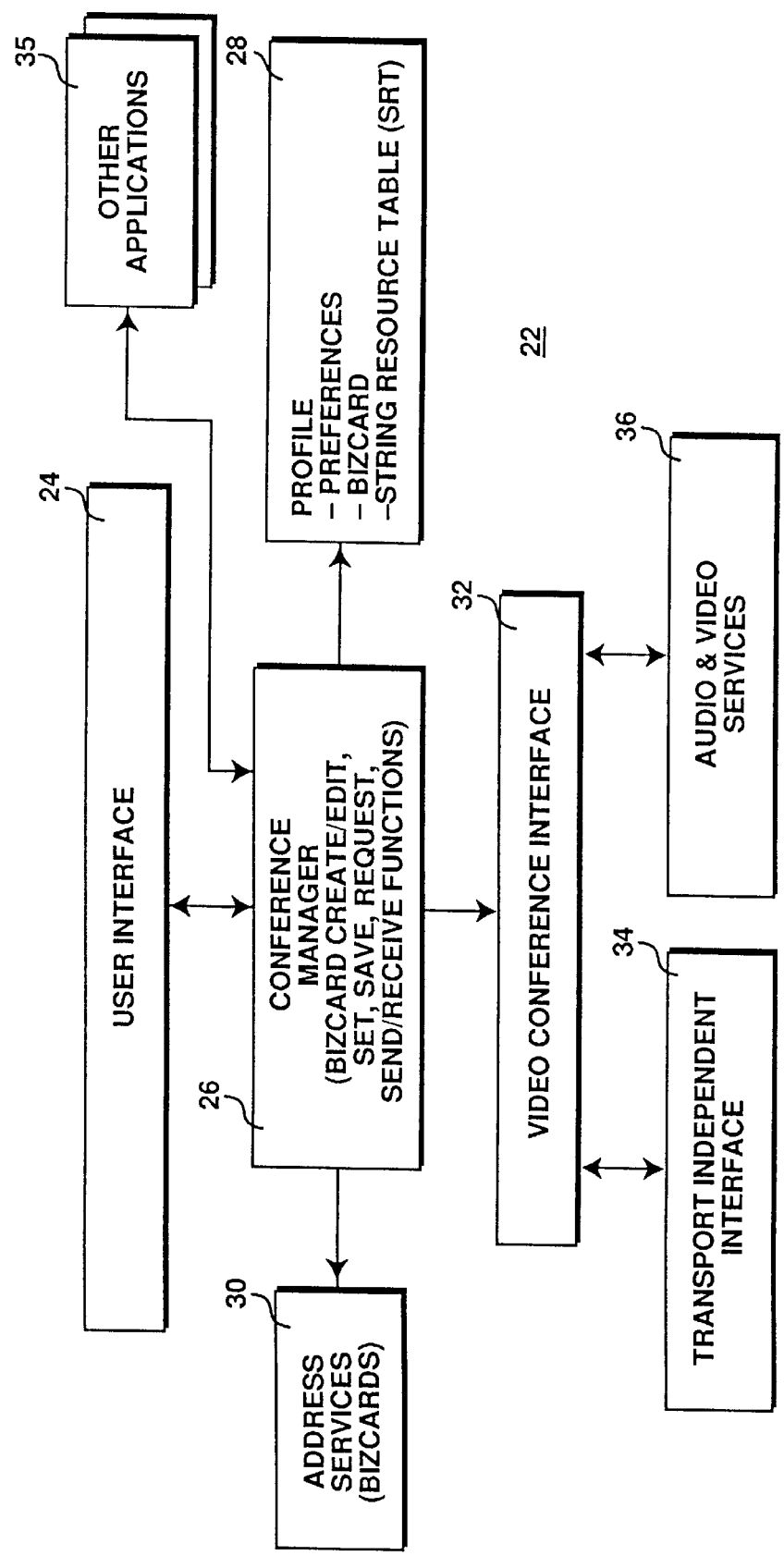
FIG. 3 is a block diagram illustrating one embodiment of a GPEC application incorporated in each of the conferencing systems of FIGS. 1–2.

FIG. 3 is a block diagram illustrating one embodiment of a GPEC application incorporated with the teachings of the present invention in further detail. As shown, for this embodiment, GPEC application 22 comprises user interface 24, conference manager 26, profile data 28 and address services 30. Furthermore, GPEC application 22 comprises transport independent services 34, extended A/V services 36, and an "integrated" interface 32 to these services 34 and 36. In the presently preferred embodiment, GPEC application 22 is implemented in an object-oriented manner using the programming language C++.

User interface 24 provides display windows with menus, buttons etc. for interacting with a user. In particular, in accordance to the present invention, use interface 24 includes enhancements for facilitating set up and exchange of bizcards. Conference manager 26 manages electronic conferences including the conferencing applications 35. In particular, in accordance to the present invention, conference manager 26 also manages automatic exchange of bizcards between the user and other conference participants. Preferably, conference manager 26 also assists a user in setting up his/her bizcard at installation time. Profile 28 stores various user preferences. In particular, in accordance to the present invention, profile 28 includes the user's bizcard, the user's preference on whether a received bizcard is to be displayed automatically, and a string resource table for displaying bizcards. Address services 30 provide services related to managing connection addresses for conference participants. In particular, address services 30 include services for retrieving, browsing and re-sending saved bizcards. The above described enhancements, functions, and services in accordance to the present invention will all be described in further detail below.

Transport independent services 34 provide connection services on multiple transport media and multiple connections. A/V services 36 provide sampling, digitization, compression/decompression of audio signals exchanged, as well as capture and playback services for video streams including interfacing with the proper CODEC to compress and decompress the video signals. Integrated interface 32 provides abstraction of these transport and A/V services, enabling the serviced application to perform call management, data and/or file channel management, and A/V streams management. These and other related services are known in the art, and therefore will not be described in further detail.

Figure 4:
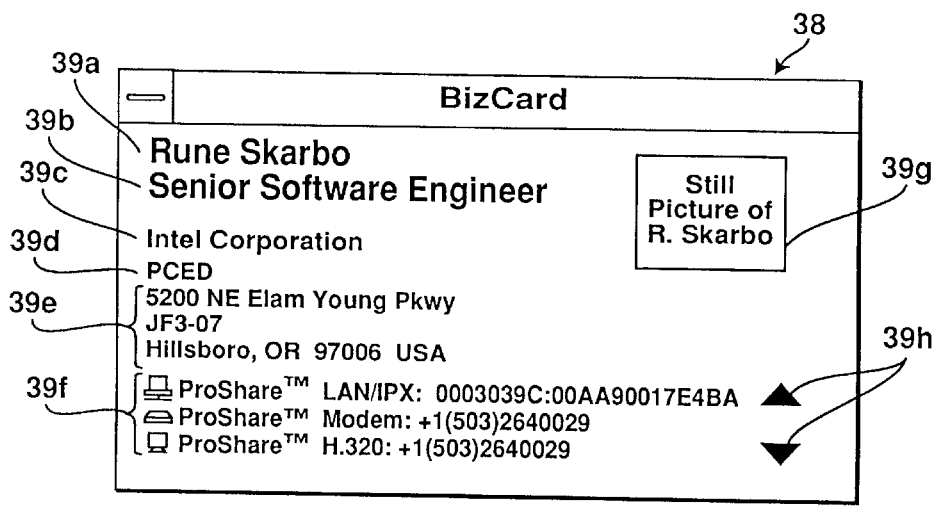
FIGS. 4–6 are block diagrams illustrating the external manifestation and internal representations of the electronic "business card" (hereinafter bizcard) of the present invention.
Figure 5:
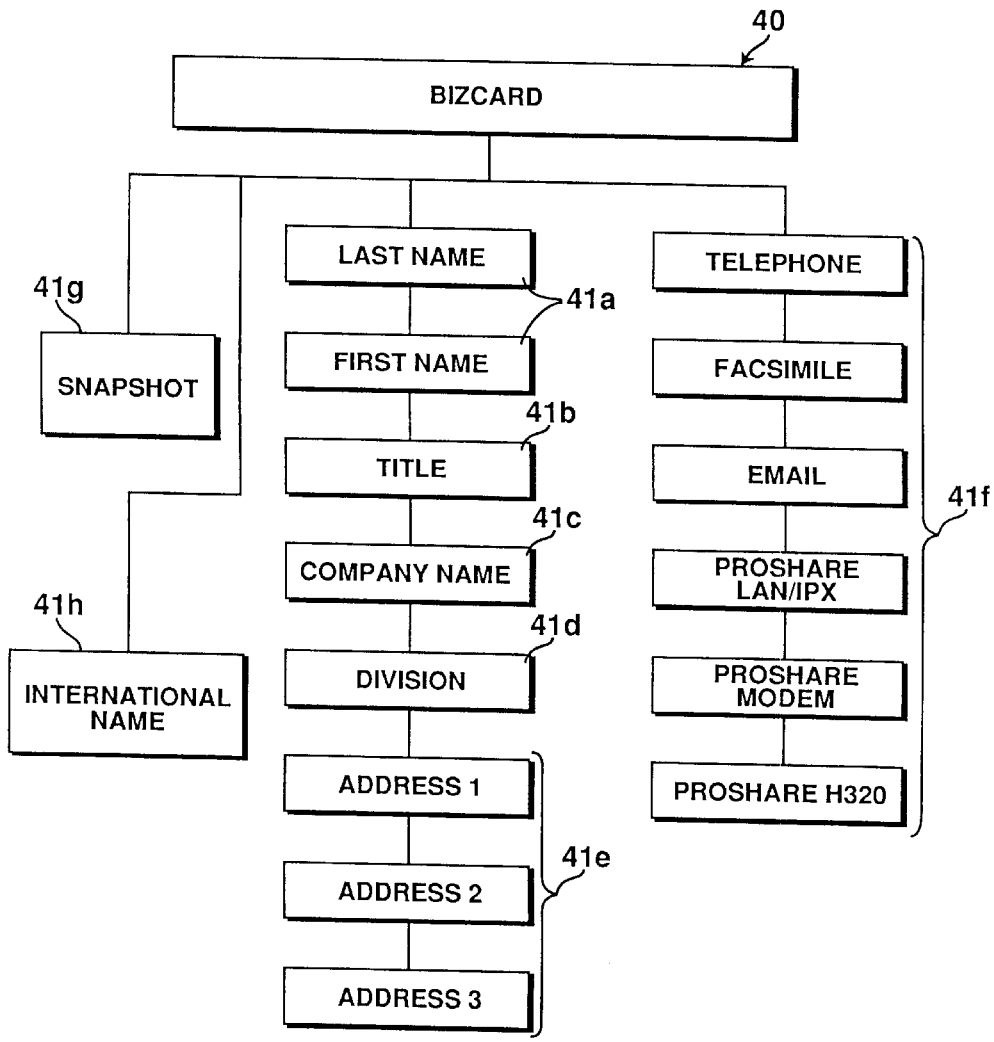
Figure 6:
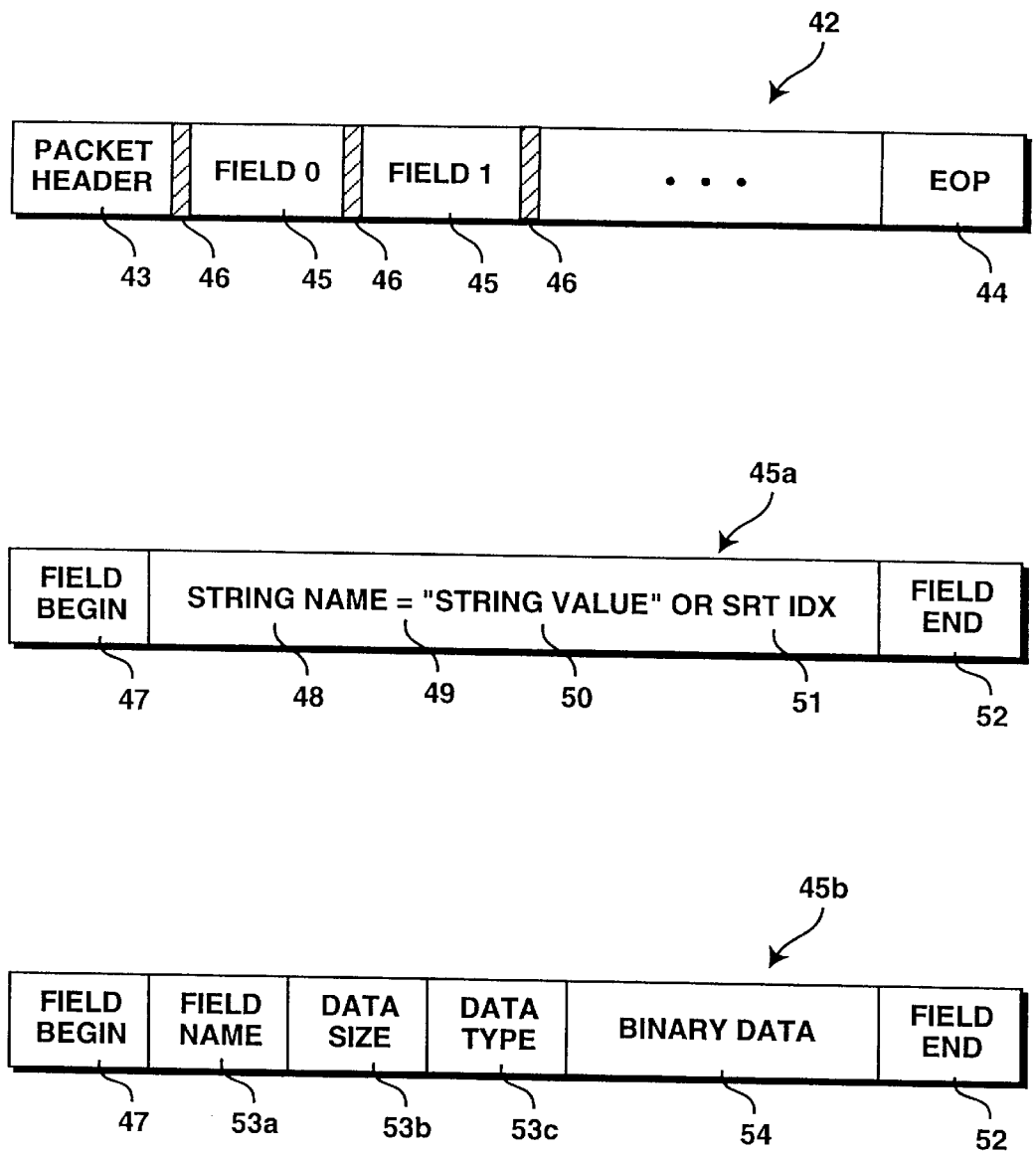

FIGS. 4–6 are block diagrams illustrating the external manifestation and internal representation of a bizcard of the present invention. As shown in FIG. 4, the external manifestation is a visual representation 38 of information commonly found on physical business cards in a format that resembles a physical business card. These information include name 39a, title 39b, company 39c, division 39d, address 39e, phone numbers 39f etc. Preferably, the phone numbers 39f include all electronic conferencing phone numbers/network addresses, in addition to conventional voice and facsimile phone numbers, and the phone numbers are scrollable 39h. Furthermore, the visual presentation 38 includes a picture 39g of the person named. Alternatively, a company logo may be included.

As shown in FIG. 5, internally, the information including the data necessary to render the picture 41g are maintained in data structure 40. Data structure 40 include data elements 41a–41h necessary to store the captured information, in particular, data element 41h for storing an international name, to be described more fully below. Data necessary to render the picture 41g may be stored in any number of graphics format well known in the art.

FIG. 6 further illustrates how data structure 40 is maintained in memory during operation, and transmitted from one conferencing system to another. As shown, data elements of data structure 40 are maintained in self-describing fields 45 separated by a predetermined delimiter 46. At transmission time, data structure 40 is packaged into a communication packet 42 with packet header 43 and end-of-packet delimiter 44. For the illustrated embodiment, there are two types of self-describing fields, a string type 45a for string data, and a binary type 45b for binary data. Examples of string data are last and first name 41a, title 41b, etc. An example of binary data is snapshot 41g. A string type field 45a will encode the string data in an expression format, e.g. string name="string value" or an index into the string resource table (RST). A binary type field 45b includes field name 53, data size 54a, data type 54b, and the binary data 54c. An example of data type 54b is "device independent bitmap" (DIB). Both types of fields are enclosed by field begin and field end markers 47 and 52. The manner in which the string and binary data are extracted from data structure 42 for display will be described in more detail below.

In accordance with the present invention, bizcard data structure 42 is always transmitted with the native language included as one of the string fields 45a. Preferably, the operating system of the bizcard originating conferencing system is always included as one the string fields 45a. In one embodiment, the different native languages that can be encountered in bizcard exchanges is a predeterminable finite set. Furthermore, native languages are categorized as either an American National Standard Institute (ANSI) or a double byte character set (DBCS) language, and whether a native language is an ANSI or a DBCS language is known ahead of time.

Figures 7, 8:
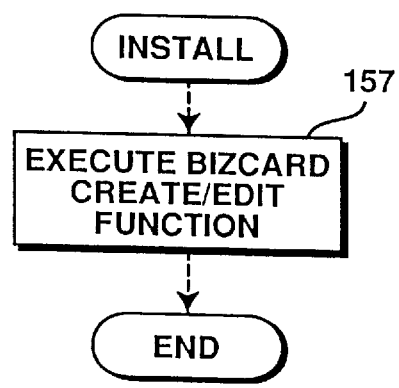
FIG. 7 is a block diagram illustrating one embodiment of a resource string table incorporated in the GPEC application of FIG. 3.
FIGS. 8–9 are flow diagrams illustrating the operational steps of one embodiment of the functions incorporated in the conference manager of FIG. 3 for setting up and editing a bizcard for a user, suitable for international electronic conferencing.

FIG. 7 is a block diagram illustrating one embodiment of a string resource table 55. A string resource table 55 includes a number indexed string entries 56, each including an indexed string 58 and the corresponding predetermined index 57. String resource table 55 is used to enable selected strings to be displayed in their native language. For example, a predetermined index value of x is assigned to index the string "office". On a conferencing system configured with the English language, an indexed string entry 56 comprising the index value of "x" and the indexed string of "office" is stored in string resource table 55. On the other hand, on a conferencing system configured with the French language, an indexed string entry 56 comprising the index value of "x" and the indexed string of "bureau" is stored in string resource table 55. Thus, by maintaining any field in bizcard data structure 42 that uses the string "office" with the string index value "x" instead, and transmitting bizcard data structure 42 with these fields in their indexed form, the string "office" can be displayed on each of the participating conferencing systems in the corresponding equivalents of each of the native languages supported. Preferably, string resource table is provided by the underlying operating system or the conferencing application.

Figure 9:
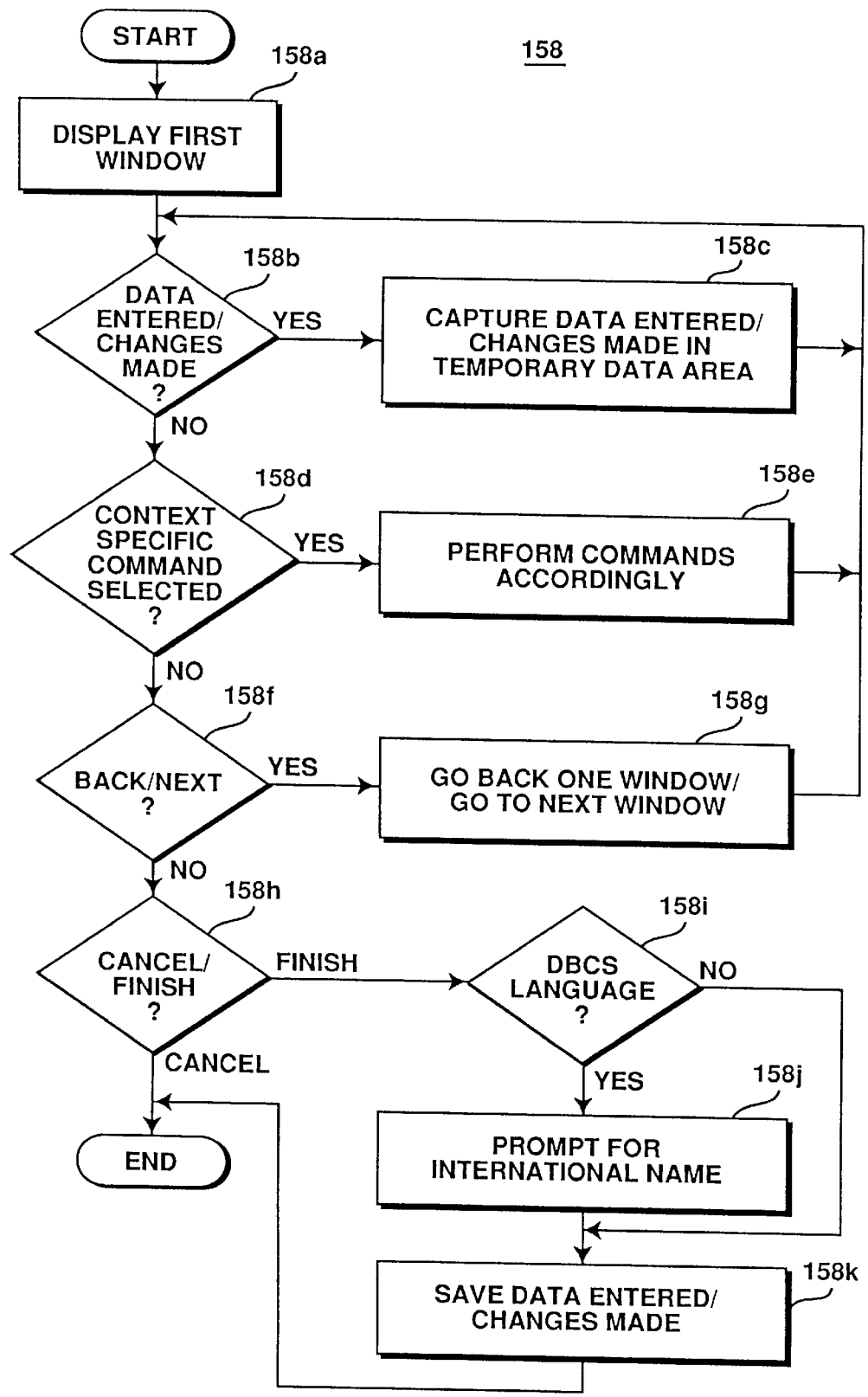
Figure 10:
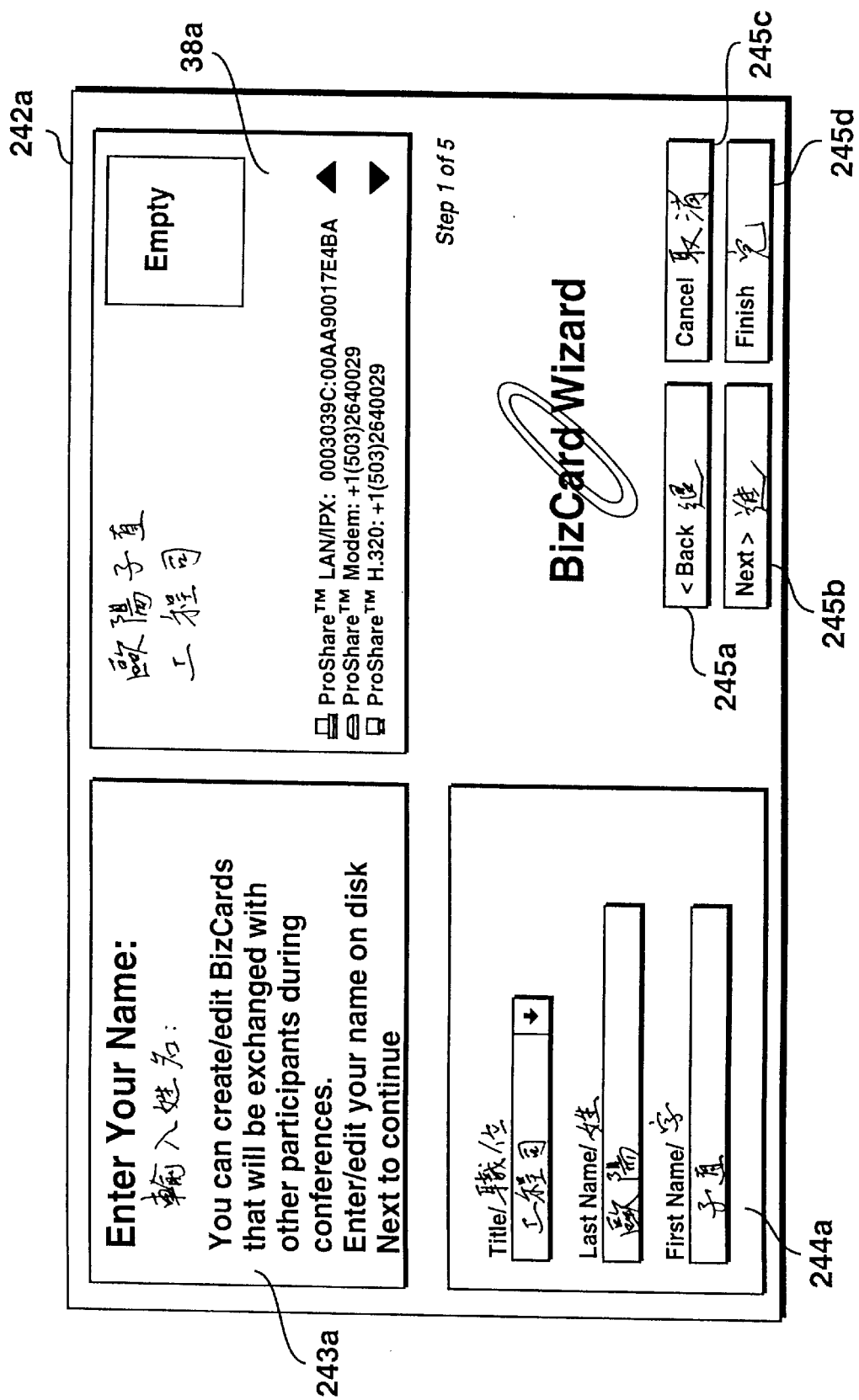
FIGS. 10–15 are "snapshots" illustrating one embodiment of the end user interface employed by the functions illustrated by FIG. 8–9.
Figure 11:
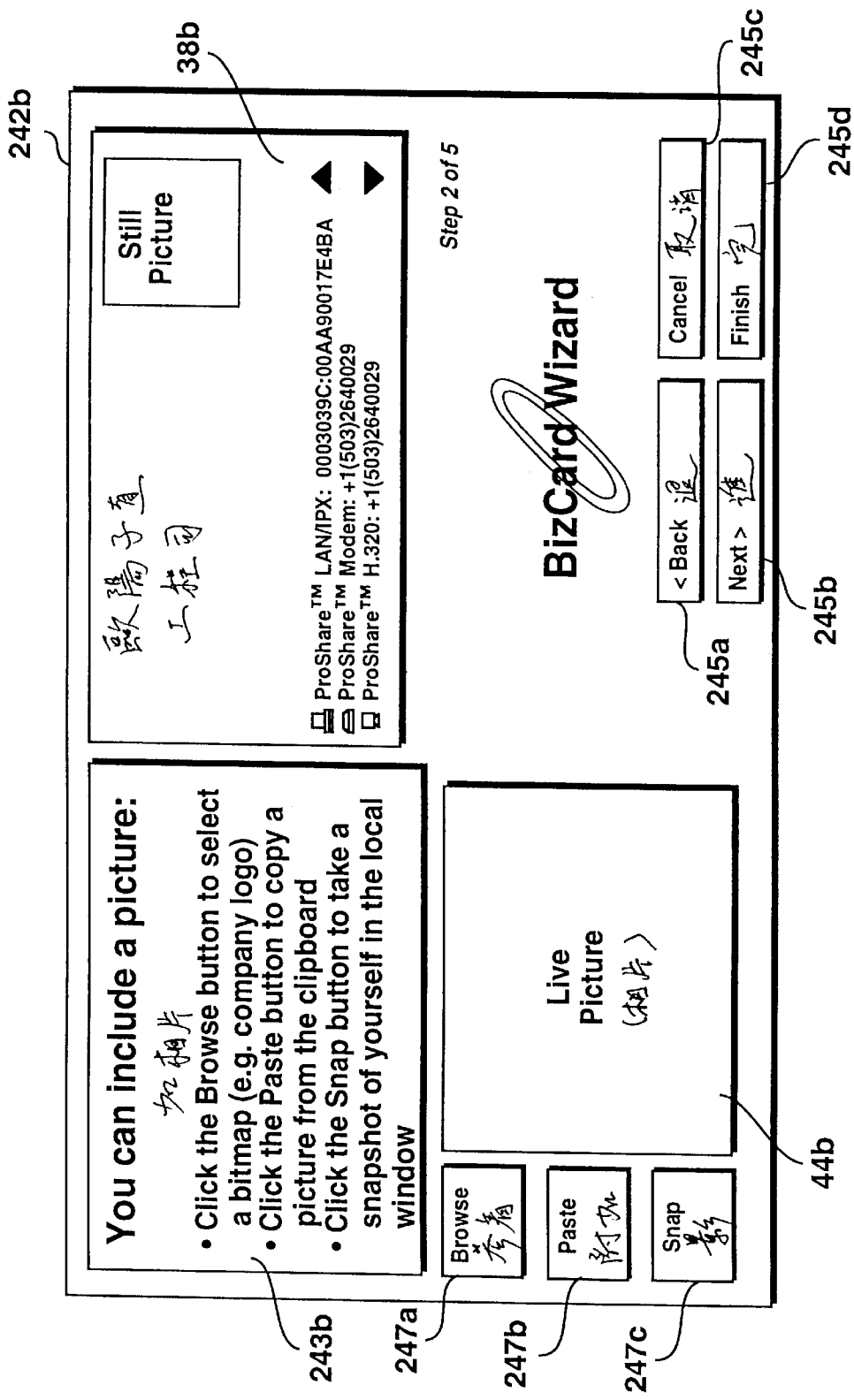
Figure 12:
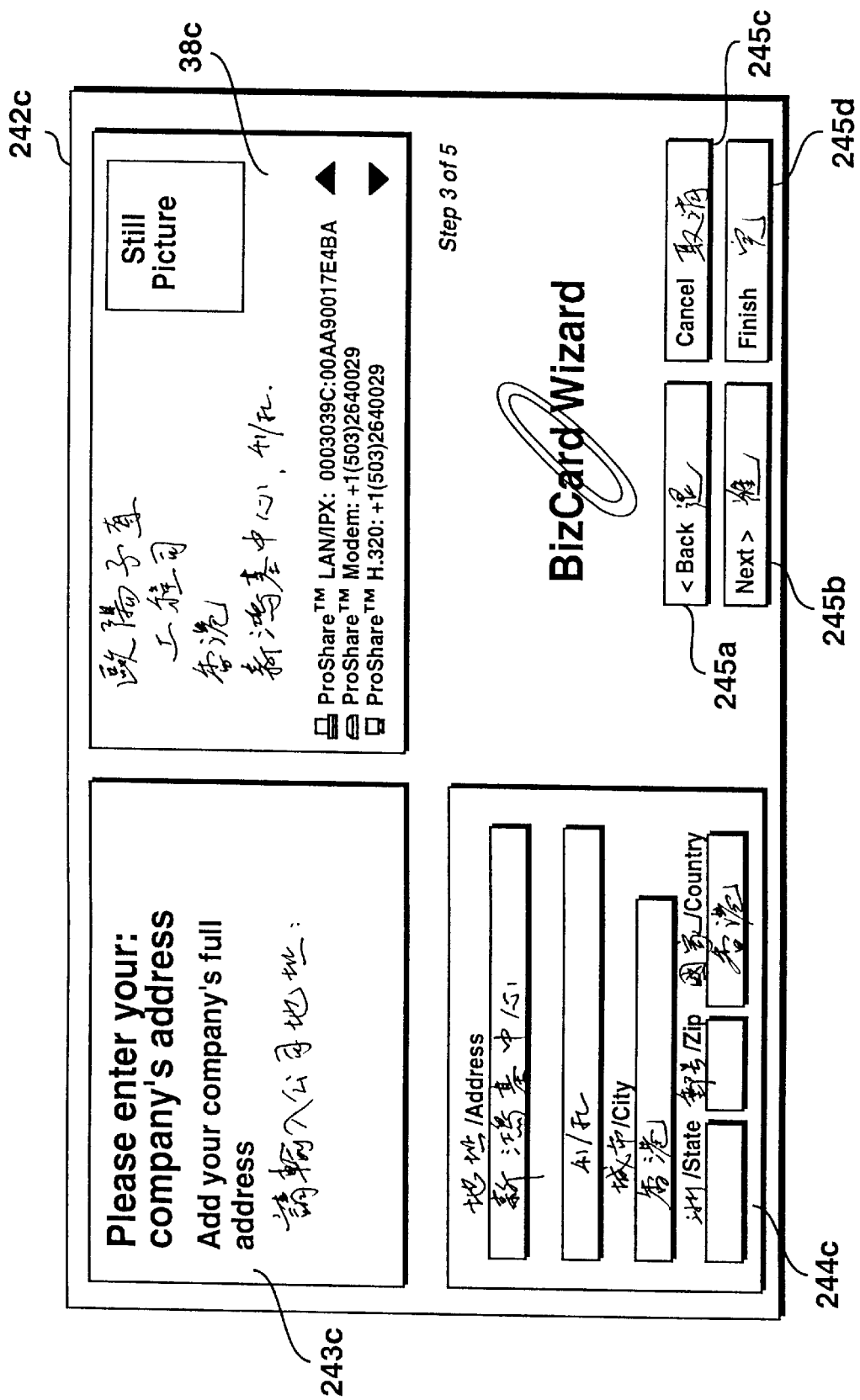
Figure 13:
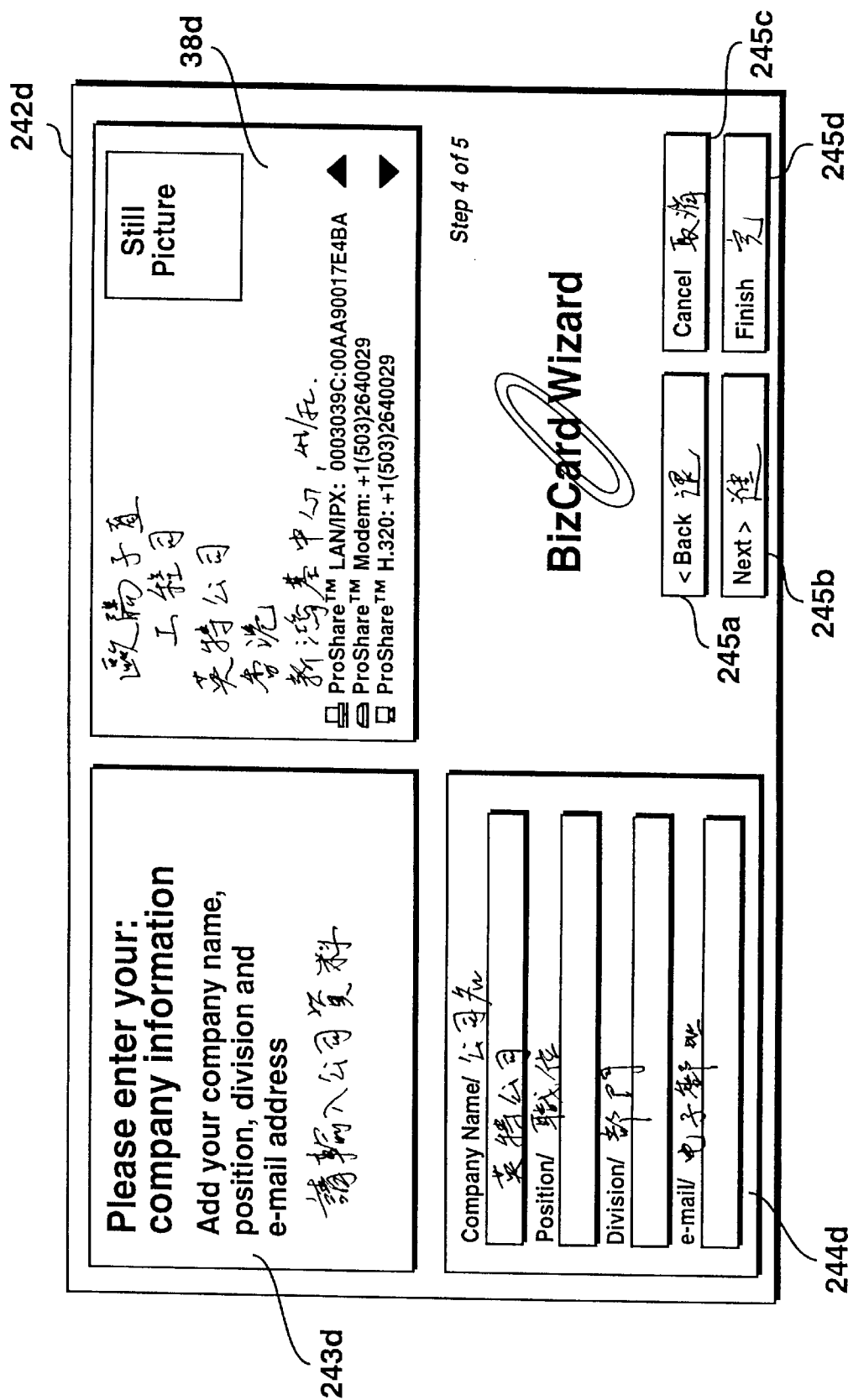
Figure 14:
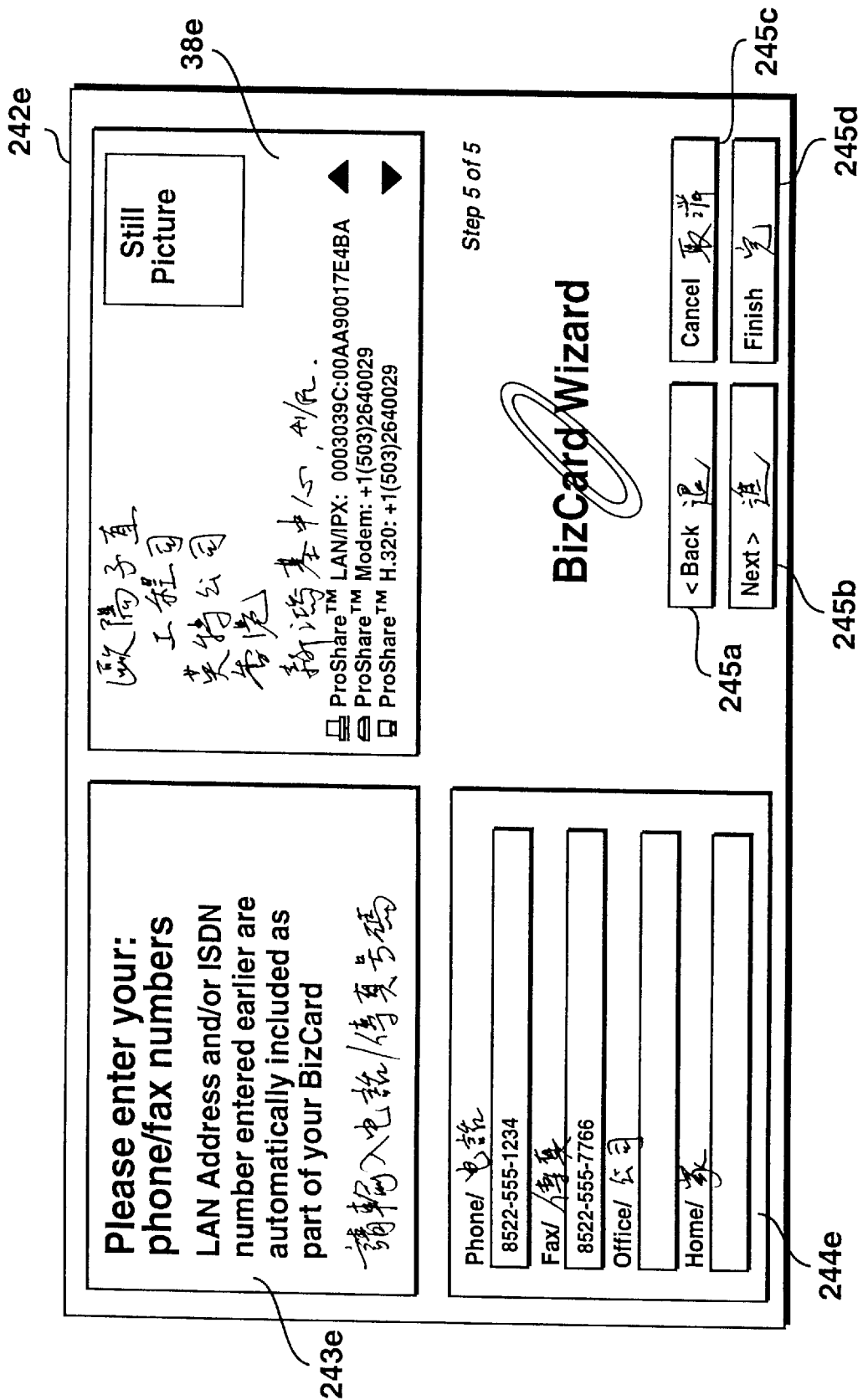
Figure 15:
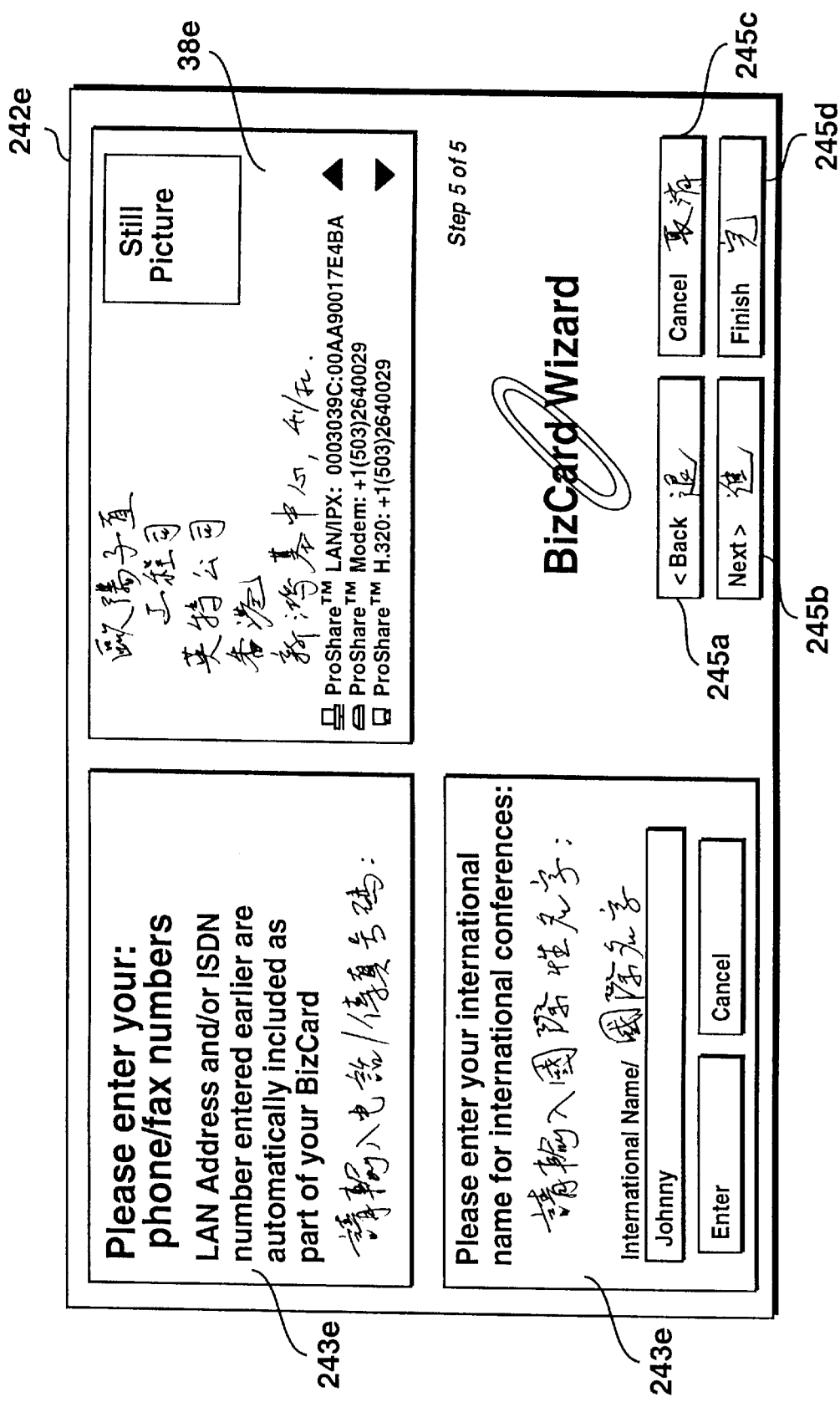

FIGS. 8–9 are two flow diagrams illustrating the operational steps of one embodiment of the functions incorporated in conference manager 26 for setting up a user's bizcard 38. As shown in FIG. 8, as part of the install process, a bizcard create/edit function is invoked, step 157. As shown in FIG. 9, when invoked, the bizcard create/edit function displays a first input window including instructions to the user, general navigational/control commands, context specific commands, and input areas for accepting user inputs, step 158a. If the inputs are data entered or changes made, the bizcard create/edit function captures the data entered or changes made in temporary storage area, step 158c. On the other hand, if the user selects certain context specific commands, the bizcard create/edit function then performs the selected commands accordingly, step 158e. However, if the user selects a navigational command, such as going back one window or going forward to the next window, the bizcard create/edit function refreshes the display with the appropriate window, step 158g. Finally, if a cancellation control command is selected, the bizcard create/edit function exits without saving the data entered or changes made first, whereas if a normal exit control command is selected, the bizcard create/edit function conditionally prompts for an international name and then saves the data entered or changes made before exiting, step 158i–158k. When saving the data entered or changes made, the create/edit function replaces the string values that are indexed in string resource table 55 with their index values 57, and save the indexed values instead.

An international name is a string field that can be displayed in all languages. Typically, it is constituted with ANSI characters, e.g. the English alphabets. In one embodiment, the create/edit function prompts for the international name if the native language of the conferencing system is a double-byte character set (DBCS) language, e.g. Chinese, Japanese.

FIGS. 10–15 are screen snapshots illustrating one embodiment of the user interfaces employed by the bizcard create/edit function. As shown, under this embodiment, all windows 242a–242e comprise instructions to the user 243a–243e, navigation commands (Back, Next) 245a–245b, normal/exceptional termination control commands (Cancel, Finish) 245c–245d, data input areas 244a–244f, and a visual representation of the bizcard 38a–38e being set up. Additionally, a window may have window specific commands. For example, window 242b has exemplary window specific commands Snap, Browse and Paste 247a–247c. Snap 247c causes a snapshot of the user to be taken using the video devices of the system, and the snapshot to be used as the picture to be incorporated in bizcard 38. Alternatively, Browse 247a is used to display and select an existing picture or logo (more specifically, a file containing the desired picture or logo), and Paste 247b is used to incorporate the selected picture or logo in bizcard 38. For the illustrated embodiment, the prompting for the entry of the international name is presented to the user as a "pop-up" dialog box 244f. For the example illustrated, the Chinese engineer prefers to be referred to as "Johnny" on a conferencing system that does not support the Chinese character set, in an international electronic conference.

Figure 16:
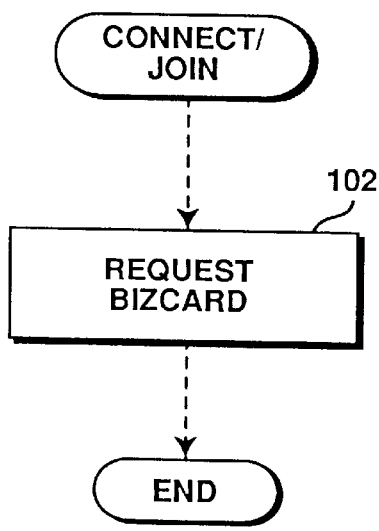
FIGS. 16–21 are flow diagrams illustrating the operational steps of one embodiment of the functions incorporated in the conference manager of FIG. 3 for automatically exchanging bizcards with other conference participants of an international electronic conference.
Figure 17:
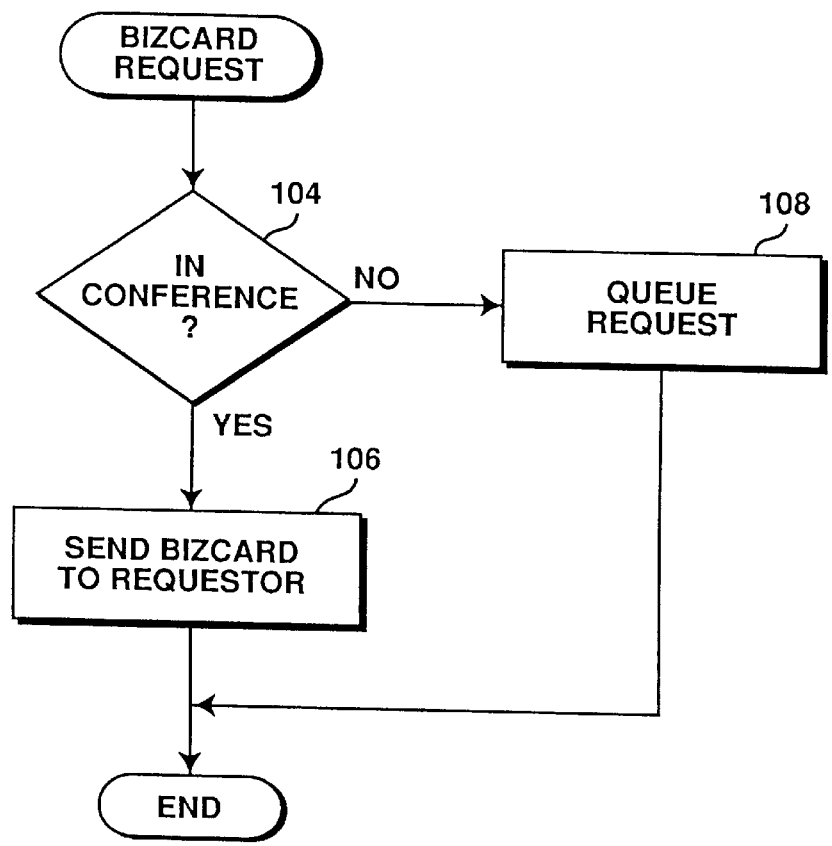

FIGS. 16–19 are flow diagrams illustrating the operational steps of one embodiment of the request management and send/receive functions of conference manger 26. As shown in FIG. 16, in response to a conference participant "connecting" or "joining" event, in addition to the normal connect/join processing, conference manager 26 issues a request to the connecting/joining conference participant for his/her bizcard, step 102. As shown in FIG. 17, in response to a bizcard request event, the request management function of conference manager 26 first checks the state of GPEC application 22 and determines whether the user is in conference, step 104. If the user is in conference, then the send/receive function is invoked to send the user's bizcard 38 to the requester, step 106. Otherwise, the request management function queues the bizcard request in its request queue, step 108. As will be appreciated by those skilled in the art, in lieu of an exclusive bizcard request queue, a multi-purpose request queue wherein the nature of a request is identifiable may also be used.

Figure 18:
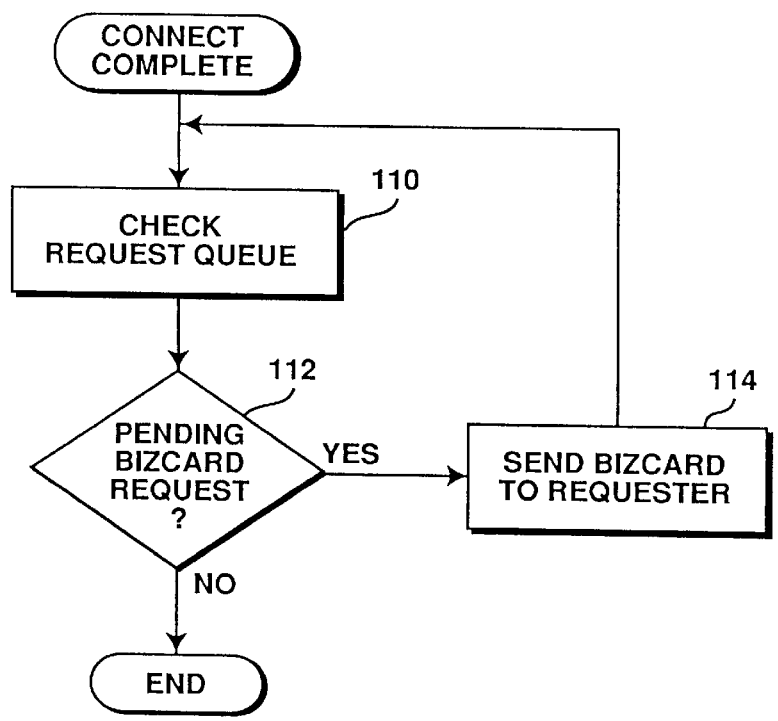
Figure 19:
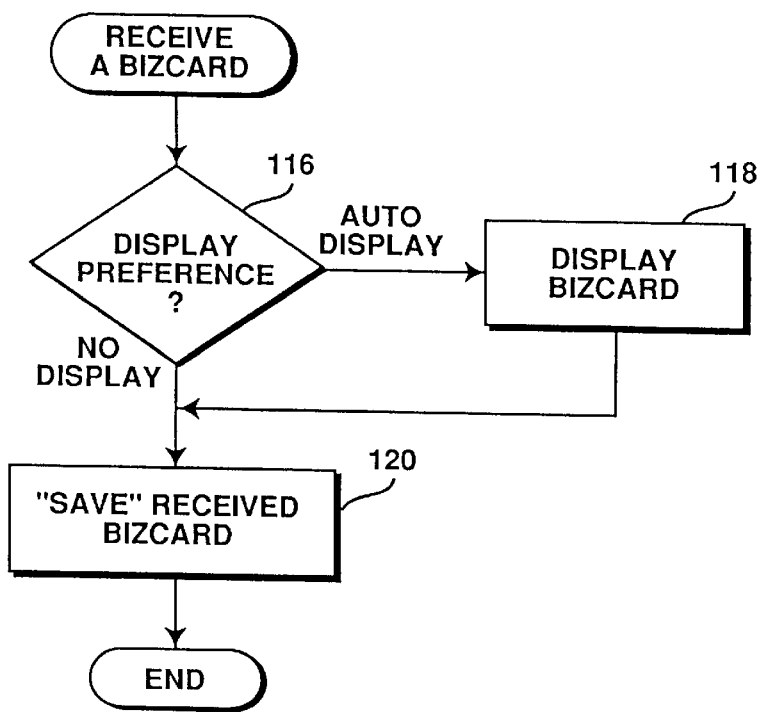

As shown in FIG. 18, in response to a connection processing complete event, i.e. the GPEC application is in a state of "in conference", the request management function of conference manager 26 checks the request queue to determine whether there are any pending bizcard requests, step 110. If there are no pending request, the request management function takes no further action. On the other hand, if there is at least one pending bizcard request, for each pending bizcard request, the send/receive function is invoked to send the user's bizcard 38 to the requester, step 114. The process is repeated until all bizcard requests have been answered, steps 110 and 114. As will be appreciated by those skilled in the art, the string indices of a bizcard are sent as is, without converting them back to their indexed strings As will be described in more detail below, the conversion is performed by the receiving GPEC application. As shown in FIG. 19, in response a bizcard receipt event, the send/receive function of conference manager 26 first checks the user's display preference setting, step 116. If the preference setting is set to "auto display", the send/receive function causes the received bizcard 38 to be rendered, step 118. Regardless of the preference setting, preferably, the send/receive function also saves the received bizcard for subsequent retrieval, if the user does not already has a copy of the received bizcard, step 120. Furthermore, the "saving" into a permanent storage is preferably deferred until conference termination. By deferring saving into permanent storage, more CPU cycles would be available for performing real time processing of audio and video data. Moreover, it is more efficient for a multipoint conference to save all received bizcards 38 at the same time, as opposed to saving the bizcards 38 as they are received, since presumably each saving will require file opening and closing.

Figure 20:
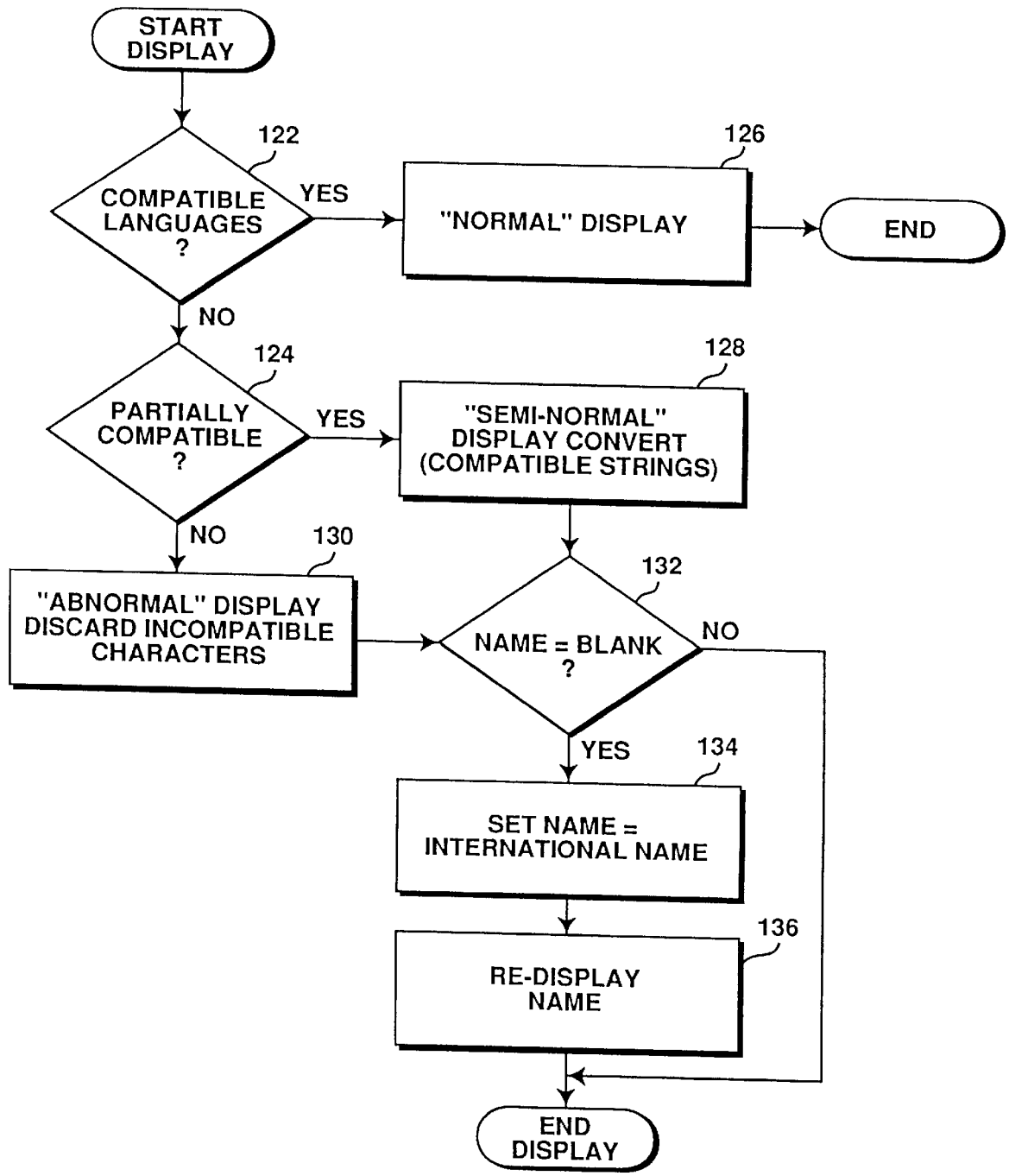

As shown in FIG. 20, to display the received bizcard 38, the receive function determines if the language of the received bizcard 38 and the language of the receiving conferencing system are compatible, partially compatible or incompatible languages, steps 122 and 124. For the illustrated embodiment, the determination is made in accordance to a set of general language compatibility rules. More specifically, two identical DBCS languages or any two ANSI languages are considered to be compatible with each other, whereas an ANSI and a DBCS language are considered to be partially compatible if the ANSI language is the language for the received bizcard and the DBCS language is the language for the receiving system, and incompatible if the situation is reversed. Two different DBCS languages are also considered to be incompatible. If the languages were determined to be compatible, received bizcard 38 is parsed and displayed "normally", step 126. If the languages were determined to be partially compatible, received bizcard 38 is parsed and displayed "semi-normally", converting the string characters as necessary, e.g. the ANSI characters are converted to their DBCS equivalents, step 128. If the languages were determined to be incompatible, received bizcard 38 is parsed and displayed "abnormally", with DBCS characters discarded, step 130. Additionally, upon performing step 128 or 130, the receive function further determines if the name field is blank (which means the received name was in DBCS characters and the characters were discarded), step 132. If the name field is blank, the receive function sets the name field to the international name, step 134, and then re-displays the name field, step 136. As a result, a conference participant employing a conferencing system configured with a partially compatible or incompatible language is nevertheless identifiable to the other conference participants. In one embodiment, other conferencing applications 35 are notified whenever a bizcard is received.

Figure 21:
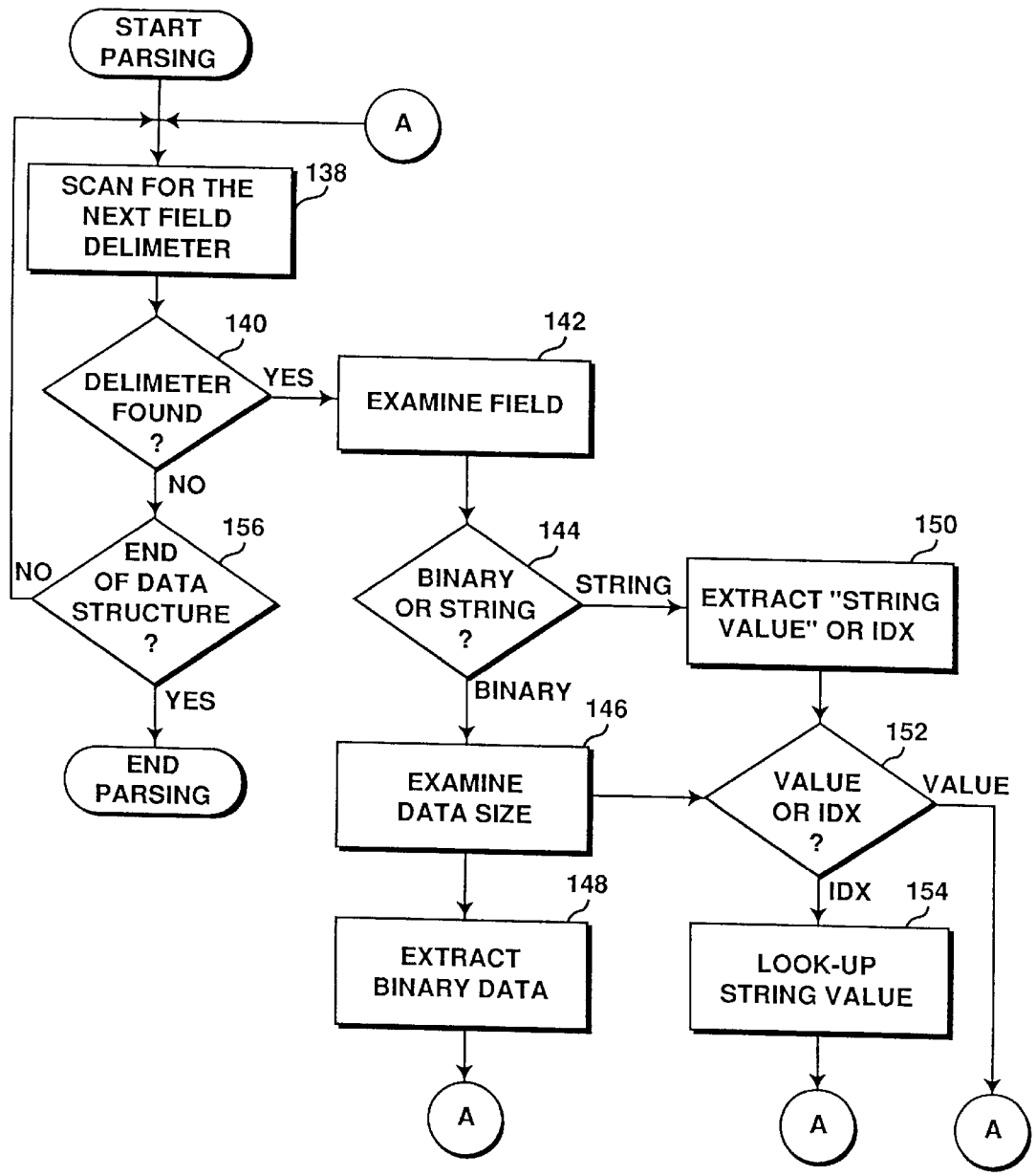

As shown in FIG. 21, to parse the received bizcard 38, the receive function scans for the next field delimiter, step 138. Once found, step 140, the receive function examines the field to determine the field type, steps 142–144. If the field is a binary field, the receive function examines the data size, and extract the binary data accordingly, step 146–148. On the other hand, if the field is a string field, the receive function extracts the string value/index, step 150. If a string index is extracted, step 152, the receive function looks up the string value in the string resource table, step 154. In all cases, upon extraction of binary data or extraction/lookup of string value, the receive function scans for the next delimiter again. The process continues, until all field values have been extracted, i.e.. the end of packet has been reached, step 156.

As will be appreciated by those skilled in the art, the two-phased approach to exchanging bizcards among conference participants of the present invention described above is transparent to the conference participants. In other words, from the conference participants' perspectives, the behavior for exchanging business cards in face-to-face conferences is modeled in like manner, except for the fact that for the behavior is modeled more reliably notwithstanding wider performance differences among the participating conferencing systems.

Figure 22:
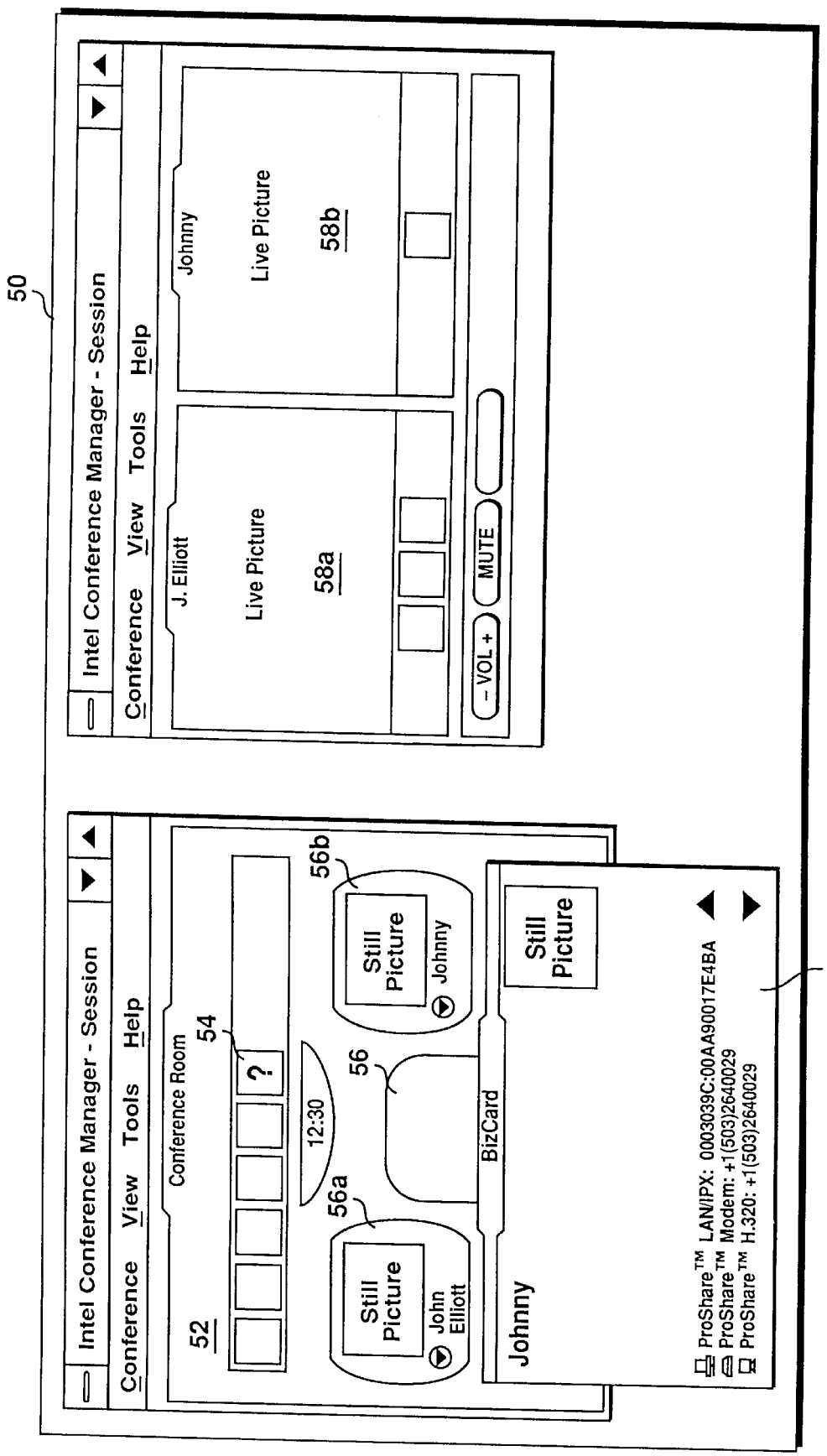
FIG. 22 is a snapshot illustrating one embodiment of the end user interface employed by the GPEC application of FIG. 3 for conducting international electronic conferences.

FIG. 22 is a snapshot illustrating one embodiment of the end user interface employed by the conference manager to display received bizcard 38. In particular, the figure illustrates the display of one conference participant's bizcard ("Johnny") at another conference participant's conference session window (Elliott) 50, when the two participants first joined together in conference. For the illustrated example, the international name "Johnny" is used because the content of Johnny's bizcard is either incompatible or at most, partially compatible with the language of Elliot's conferencing system.

Figure 23:
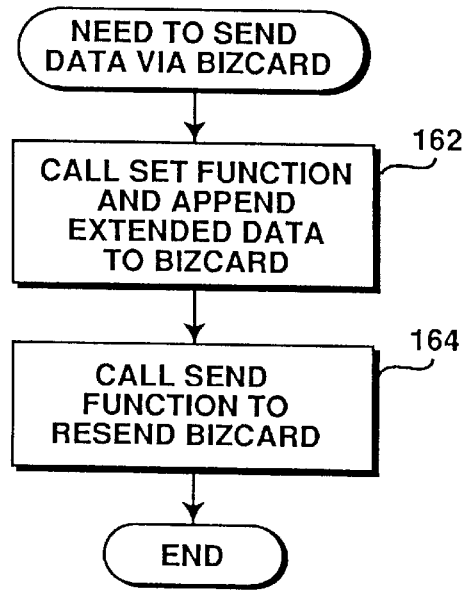
FIGS. 23–24 are flow diagrams illustrating the operational steps of one embodiment of one extended aspect of the functions incorporated in the conference manager of FIG. 3 for a cooperative application to transmit data to a counterpart application using the bizcard.
Figure 24:
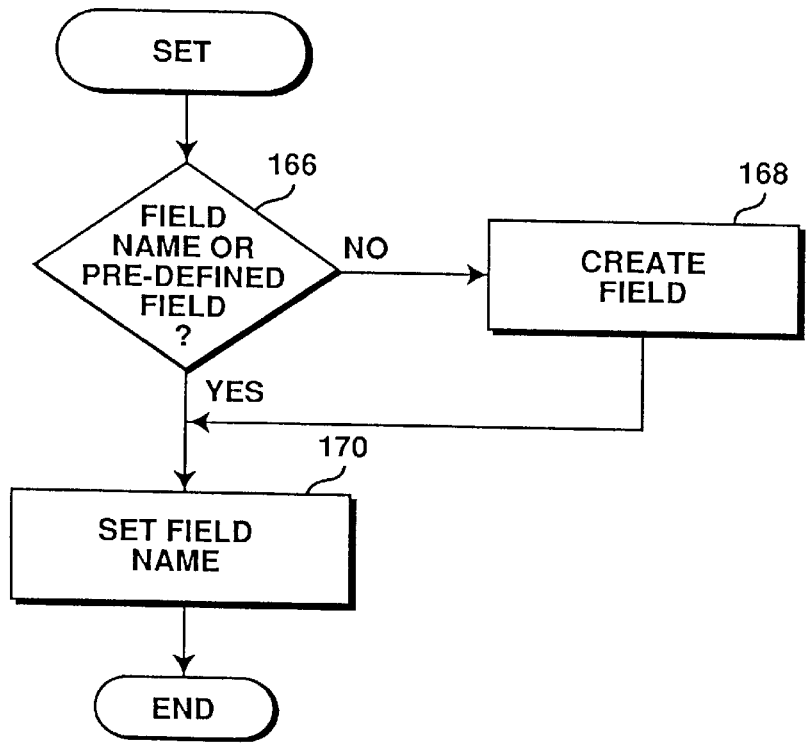

Since in accordance to the present invention, the fields of the internal data structure of bizcard 38 are self-describing, thus the internal data structure of bizcard 38 is extensible. As a result, extensible bizcard 38 becomes a very handy vehicle for cooperative conferencing applications to send data to each other, particularly small amount of data. FIGS. 23–24 are flow diagrams illustrating the operating steps for exploiting the extensible character of bizcard 38. As shown in FIG. 23, whenever a cooperative conferencing application 35 determines it wants to exploit the extensible character of bizcard 38, the cooperative conferencing application 35 calls a set function of conference manager 26 to set a data field to a particular value, step 162. Upon setting the value, the cooperative conferencing application 35 then calls the send function of conference manager 26 to send bizcard 38, step 164. In one embodiment, where the GPEC application supports automatic resend of bizcard 38 for selected events, the cooperative conferencing application 35 may trigger one of the selected events, thereby resulting in bizcard 38 with the updated data being send. As shown in FIG. 24, upon invocation, the set function first determines if the field name is one of the "base set" field names, i.e. last name, first name, etc., step 166. If the field name is one of the "base set" field names, the set function sets the field with the provided field value accordingly, step 170, otherwise, the set function creates the new field, step 168 before performing step 170.

Thus, a method and apparatus for modeling business card exchanges in an international electronic conference has been described. While the method and apparatus of the present invention has been described in terms of the above illustrated embodiments, those skilled in the art will recognize that the invention is not limited to the embodiments described. The present invention can be practiced with modification and alteration within the spirit and scope of the appended claims. The description is thus to be regarded as illustrative instead of restrictive on the present invention.

What is claimed is:

1. A conferencing system comprising a computer programmed with a general purpose electronic conference (GPEC) application having a conference manager that includes a first function for receiving and rendering one or more business card data structures from one or more other conference systems of an electronic conference during operation to model business card exchanges between conference participants of a face-to-face conference, each business card data structure having information commonly found in business cards as well as an international name constituted with characters displayable on display devices of a plurality of languages, said first function rendering each business card data structure on a display of the conferencing system in a format that resembles physical business cards, conditionally using the international name(s) depending on language compatibility/compatibilities between the received business card data structure(s) and the conferencing system.

2. The conferencing system as set forth in claim 1, wherein
each of said received business card data structures further includes a language designation for the received business card data structure's originating conferencing system; and
when rendering a received business card data structure, said first function ignores the international name if the language designation for the received business card data structure's originating conferencing system is compatible with the conferencing system.

3. The conferencing system as set forth in claim 1, wherein
each of said received business card data structure further includes a language designation for the received business card data structure's originating conferencing system; and
when rendering a received business card data structure, said first function remaps supported string characters in the received business card data structure if the language designation for the received business card data structure's originating conferencing system is partially compatible with the conferencing system, and includes the international name in said rendering if standard name fields in the received business card data structure were constituted with unsupported string characters.

4. The conferencing system as set forth in claim 1, wherein
each of said received business card data structures further includes a language designation for the received business card data structure's originating conferencing system; and
when rendering a received business card data structure, said first function discards all string characters in the received business card data structure if the language designation for the received business card data structure's originating conferencing system is incompatible with the conferencing system, and includes the international name in said rendering.

5. The conferencing system as set forth in claim 1, wherein
said conference manager further includes a language dependent string resource table comprising a plurality of indexed language dependent string values;
some of said received business card data structures include field values expressed in terms of string indices; and
when rendering one of these received business card data structure, said first function looks up the indexed language dependent string values in said string resource table using the string indices.

6. The conferencing system as set forth in claim 1, wherein the conference manager further includes a second function for sending a similar business card data structure having an international name constituted with characters displayable in a plurality of languages to said other conference participants.

7. The conferencing system as set forth in claim 6, wherein
each data field in a business card data structure is a self-describing field;
the conference manager further includes a third function for a cooperative application to append a new field to the business card data structure.

8. The conferencing system as set forth in claim 7, wherein
said second function sends said similar business card data structure in response to an event;
said cooperative application triggers said event whenever it wants the appended field(s) to be sent to said other conferencing systems.

9. The conferencing system as set forth in claim 6, wherein the conference manager further includes a third function for creating/editing said similar business card data structure for said conferencing system.

10. The conferencing system as set forth in claim 9, wherein the second function prompts for the international name when a user finished creating/editing his/her business card data structure.

11. A network of conferencing systems comprising a first and a second conferencing system, the first and second conference systems having a first and a second computer programmed with a first and a second general purpose electronic conference (GPEC) application including a first and a second conference manager having a first and a second function respectively for receiving and rendering at least a first and a second business card data structure from each other during an electronic conference to model business card exchanges between conference participants of a face-to-face conference, said first and second business card data structures having information commonly found in business cards as well as a first and a second international name constituted with characters displayable on display devices of a plurality of languages, said first and second functions rendering said first and second business card data structures on a first and a second display of said first and second conferencing systems respectively, in a format that resembles physical business cards, conditionally using said first and second international names depending on language compatibility between said first and second conferencing systems.

12. The network of conferencing systems as set forth in claim 11, wherein said first and second received business card data structures further include a first and a second language designation for said first and second conferencing systems respectively; and when rendering said first/second received business card data structure, said first/second function ignores said first/second international name if said first/second language designation is compatible with said first/second conferencing system.

13. The network of conferencing systems as set forth in claim 11, wherein said first and second received business card data structures further include a first and a second language designation for said first and second conferencing systems respectively; and when rendering said first/second received business card data structure, said first/second function remaps supported string characters in said first/second received business card data structure if said first/second language designation is partially compatible with said first/second conferencing system, and includes said first/second international name in said rendering if standard name fields in said first/second received business card data structure were constituted with unsupported string characters.

14. The network of conferencing systems as set forth in claim 11, wherein said first and second received business card data structures further include a first and a second language designation for said first and second conferencing systems respectively; and when rendering said first/second received business card data structure, said first/second function discards all string characters in said first/second received business card data structure if said first/second language designation is incompatible with said first/second conferencing system, and includes said first/second international name in said rendering.

15. The network of conferencing systems as set forth in claim 11, wherein said first and second conference managers further include first and second language dependent string resource tables respectively, each comprising a plurality of indexed language dependent string values;

said first and second received business card data structures include field values expressed in terms of string indices; and when rendering said first/second received business card data structure, said first/second function looks up the indexed language dependent string values in said first/second string resource table using the string indices.

16. The network of conferencing systems as set forth in claim 11, wherein said first and second conference managers further include third and fourth functions for sending said second and first business card data structures respectively.

17. The network of conferencing systems as set forth in claim 16, wherein each data field in a business card data structure is a self-describing field;

said first and second conference managers further include fifth and sixth functions for first and second cooperative applications to append new fields to said second and first business card data structures respectively.

18. The network of conferencing systems as set forth in claim 17, wherein said third and fourth functions send said second and first business card data structures in response to first and second events respectively;

said first/second cooperative application triggers said first/second event whenever it wants the appended field(s) to be sent to said second/first conferencing system.

19. The network of conferencing systems as set forth in claim 16, wherein said first and second conference managers further include fifth and sixth functions for creating/editing said second and first business card data structures for said first and second conferencing systems respectively.

20. The network of conferencing systems as set forth in claim 19, wherein said third and fourth functions prompt for said second and first international names when a first and a second user finished creating/editing said second and first business card data structures respectively.

21. In a network of conferencing systems comprising a first and a second conferencing system, a machine implemented method for modeling business card exchanges between conference participants of a face-to-face conference, said method comprising the steps of:

a) exchanging a first and a second business card data structure between said first and second conferencing systems, said first and second business card data structures having information commonly found in business cards as well as a first and a second international name constituted with characters displayable on display devices of a plurality of languages respectively; and b) rendering said first and second business card data structures on a first and a second display of said first and second conferencing systems respectively, in a format that resembles physical business cards, conditionally using said first and second international names depending on language compatibility between said first and second conferencing systems.

22. The method as set forth in claim 21, wherein said first and second received business card data structures further include a first and a second language designation for said first and second conferencing systems respectively; and said step (b) comprises said first/second function ignoring said first/second international name if said first/second language designation is compatible with said first/second conferencing system.

23. The method as set forth in claim 21, wherein said first and second received business card data structures further include a first and a second language designation for said first and second conferencing systems respectively; and said step (b) comprises said first/second function remapping supported string characters in said first/second received business card data structure if said first/second language designation is partially compatible with said first/second conferencing system, and including said first/second international name in said rendering if standard name fields in said first/second received business card data structure were constituted with unsupported string characters.

24. The method as set forth in claim 21, wherein said first and second received business card data structures further include first and second language designations for said first and second conferencing systems respectively; and said step (b) comprises said first/second function discarding all string characters in said first/second received business card data structure if said first/second language designation is incompatible with said first/second conferencing system, and including said first/second international name in said rendering.

25. The method as set forth in claim 21, wherein said first and second conference managers further include first and second language dependent string resource tables respectively, each comprising a plurality of indexed language dependent string values;

said first and second received business card data structures include field values expressed in terms of string indices; and said step (b) comprises said first/second function looking up the indexed language dependent string values in said first/second string resource table using the string indices.

26. A storage medium having stored therein a plurality of programming instructions executable by a processor of a first conferencing system, wherein when executed, the programming instructions effectuate exchanges of business card data structures with another conferencing system, wherein each of the exchanged business card data structures includes information commonly found in business cards as well as an international name constituted with characters displayable on display devices of a plurality of languages, and the programming instructions further effectuate rendering of the received business card data structure on a local display of the first conferencing system, in a format that resembles a physical business card, conditionally using the included international name depending on language compatibility between the received business card data structure and the first conferencing system.

27. The storage medium as set forth in claim 26, wherein each of the business card data structures further includes a language designation; and the programming instructions ignore the international name if the language designation of the received business card data structure is compatible with the first conferencing system.

28. The storage medium as set forth in claim 26, wherein each business card data structure further includes a language designation; and the programming instructions further remapping supported string characters in the received business card data structure if the language designation of the received business card data structure is partially compatible with the first conferencing system, and including the international name included in the received business card structure in said rendering if standard name fields in the received business card data structure were constituted with unsupported string characters.

29. The storage medium as set forth in claim 26, wherein each business card data structure further includes a language designation; and the programming instructions discard all string characters in the received business card data structure if the language designation of the received business card data structure is incompatible with the first conferencing system, and including the international name included in the received business card data structure in said rendering.

30. The storage medium as set forth in claim 26, wherein the storage medium further includes a language dependent string resource table comprising a plurality of indexed language dependent string values;

the received business card data structure includes field values expressed in terms of string indices; and the programming instructions look up the indexed language dependent string values in the string resource table using the string indices.

* * * * *